US010598861B2

(12) United States Patent
Kulick et al.

(10) Patent No.: US 10,598,861 B2
(45) Date of Patent: Mar. 24, 2020

(54) METHOD AND SYSTEM TO PASSIVELY ALIGN AND ATTACH FIBER ARRAY TO LASER ARRAY OR OPTICAL WAVEGUIDE ARRAY

(71) Applicants:Indiana Integrated Circuits, LLC, South Bend, IN (US); Rochester Institute of Technology, Rochester, NY (US); MRSI Systems, LLC, N. Billerica, MA (US)

(72) Inventors: Jason M. Kulick, South Bend, IN (US); Yi Qian, Acton, MA (US); Stefan Preble, Pittsford, NY (US); Jeffrey Steidle, Geneseo, NY (US); Michael Fanto, Rome, NY (US); Tian Lu, Osceola, IN (US)

(73) Assignees: Indiana Integrated Circuits, LLC, South Bend, IN (US); MRSI Systems, LLC, N. Billerica, MA (US); Rochester Institute of Technology, Rochester, NY (US)

( * ) Notice: Subject to any disclaimer, the term of this patent is extended or adjusted under 35 U.S.C. 154(b) by 0 days.

(21) Appl. No.: 16/565,740

(22) Filed: Sep. 10, 2019

(65) Prior Publication Data

US 2020/0003955 A1 Jan. 2, 2020

Related U.S. Application Data

(63) Continuation of application No. 16/316,683, filed as application No. PCT/US2017/042766 on Jul. 19, 2017, now Pat. No. 10,409,004.

(60) Provisional application No. 62/364,990, filed on Jul. 21, 2016.

(51) Int. Cl.
*G02B 6/30* (2006.01)
*G02B 6/293* (2006.01)
*G02B 6/42* (2006.01)

(52) U.S. Cl.
CPC .......... *G02B 6/305* (2013.01); *G02B 6/2938* (2013.01); *G02B 6/4232* (2013.01)

(58) Field of Classification Search
None
See application file for complete search history.

(56) References Cited

U.S. PATENT DOCUMENTS

2002/0076189 A1* 6/2002 McMullin ............ G02B 6/3822
385/137
2015/0063755 A1* 3/2015 Doany ............... G02B 6/02042
385/59

* cited by examiner

*Primary Examiner* — Jerry Rahll
(74) *Attorney, Agent, or Firm* — The Webb Law Firm

(57) ABSTRACT

Disclosed is a method and system for passively aligning optical fibers (4), a first waveguide array (62), and a second waveguide array (42) using chip-to-chip vertical evanescent optical waveguides (44) and (64), that can be used with fully automated die bonding equipment. The assembled system (2, 30, 60) can achieve high optical coupling and high process throughput for needs of high volume manufacturing of photonics, silicon photonics, and other applications that would benefit from aligning optical fibers to lasers efficiently.

4 Claims, 9 Drawing Sheets

METHOD AND SYSTEM TO PASSIVELY ALIGN AND ATTACH FIBER ARRAY TO LASER ARRAY OR OPTICAL WAVEGUIDE ARRAY

CROSS-REFERENCE TO RELATED APPLICATIONS

This application is a Divisional of U.S. patent application Ser. No. 16/316,683, filed Jan. 10, 2019, which is the United States national phase of International Application No. PCT/US2017/042766 filed Jul. 19, 2017, and claims the benefit of U.S. Provisional Patent Application No. 62/364,990 filed Jul. 21, 2016, the disclosures of which are hereby incorporated in their entirety by reference.

BACKGROUND OF THE INVENTION

Field of the Invention

Disclosed herein is a system and method for optically coupling an optical waveguide and an optical fiber.

Description of Related Art

Conventional methods of aligning and attaching a fiber or a laser to an optical waveguide is through active alignment. A disadvantage of active alignment, however, is that it is not capable of delivering high volume throughput and low cost manufacturing for single mode fiber and laser alignment. This is because it takes time to get all the components ready for final assembly. Secondly, it has to deal with a total of twelve axis alignment (6 axes for each of the laser and the fiber) that finally requires a relatively long amount of time for alignment. Third, the laser components have to be electrically tuned during the alignment process (this is the reason why it is called "active alignment".) This adds cost and time. It also introduces the uncertainty of actual laser performance in the field as the laser may behave differently in use than during active alignment in a clean room environment. Finally, the alignment accuracy has to be within about 0.2 micrometers in order to maintain high coupling efficiency for single mode fiber and laser alignment. This takes time and possibly reduces yield. It also requires significant care in packaging design and technique to maintain the stability of the coupling within the about 0.2 micrometer dimension throughout the device lifetime.

SUMMARY OF THE INVENTION

The following examples disclose an evanescent waveguide to facilitate alignment to within 1-2 micrometers; an assembly method using quilt packaging (QP) techniques to reduce the total number of alignment axes from 12 to 2; and a method of assembly that is amenable to fully automatic pick-and-place die bonding for a high speed processing to complete the alignment.

Generally, provided are an improved system and method for optically coupling an optical waveguide and an optical fiber. In an example, the improved system and method can use evanescent light for such optical coupling.

According to one preferred and non-limiting embodiment or aspect, provided is a system comprising: a first substrate having first and second ends, the first substrate including an optical fiber in a groove; a second substrate having first and second ends, the second substrate including a first waveguide having first and second ends, wherein the first end of the second substrate is positioned proximate to the first end of first substrate; and a third substrate having first and second ends, the third substrate including a second waveguide having first and second ends. The second and third substrates are arranged with the first ends of the first and second waveguides overlapping in spaced parallel or substantially parallel relation. The first and second substrates are arranged with the second end of the second waveguide in optical alignment with an end face of the optical fiber.

In one preferred and non-limiting embodiment or aspect, the first waveguide proximate the first end thereof can taper to a point, e.g., a rounded point, and the second waveguide proximate the first end thereof can taper to a point, e.g., a rounded point.

In one preferred and non-limiting embodiment or aspect, the first ends of the first and second waveguides can overlap by 300 micrometers±30 micrometers.

In one preferred and non-limiting embodiment or aspect, a center-to-center distance between the overlapping first ends of the first and second waveguides can be less than or equal to 2 micrometers.

In one preferred and non-limiting embodiment or aspect, the first and second waveguides can be configured whereupon light propagating to the first end of the first or second waveguide can form an evanescent light field that can be received (at least in part) by the first end of the other of the first or second waveguide. The evanescent light received by the first end of the other of the first or second waveguide can propagate away from the first end of the other of the first or second waveguide.

In one preferred and non-limiting embodiment or aspect, the third substrate can overlay a part of the first substrate and a part of the second substrate.

In one preferred and non-limiting embodiment or aspect, the first substrate can include a step having a face where the end face of the optical fiber can be exposed. At least a part of the second end of the third substrate can abut the face of the step of the first substrate.

In one preferred and non-limiting embodiment or aspect, the groove can be V-shaped.

In one preferred and non-limiting embodiment or aspect, the first end of the first substrate can include interconnect nodules, the first end of the second substrate can include interconnect nodules, and the interconnect nodules on the first end of the first substrate and the first end of the second substrate can be mated with each other.

In one preferred and non-limiting embodiment or aspect, the interconnect nodules on the first end of the first substrate and the first end of the second substrate can be mated (a) with their end faces abutting, (b) in an interdigitated manner, (c) in a friction fit manner, (d) in an interlocking manner, or (e) some combination of (a)-(d).

In one preferred and non-limiting embodiment or aspect, each interconnect nodule, individually, can be flush with or extend beyond a surface of the first end of the corresponding first or second substrate.

In one preferred and non-limiting embodiment or aspect, the first ends of the first and second waveguides overlapping in spaced substantially parallel relation can have their longitudinal axes aligned ±2°.

In one preferred and non-limiting embodiment or aspect, the first substrate can include a plurality of optical fibers, each optical fiber disposed in a separate groove, the second substrate can include a plurality of first waveguides, and the third substrate can include a plurality of second waveguides.

In one preferred and non-limiting embodiment or aspect, a spacing between adjacent second waveguides can increase toward the second end of the third substrate.

In one preferred and non-limiting embodiment or aspect, mating alignment features can be included on at least two of the substrates, e.g., on surfaces of the at least two substrates.

According to one preferred and non-limiting embodiment or aspect, provided is a method comprising: (a) providing a first waveguide having a tapered end; (b) providing a second waveguide having a tapered end; (c) positioning the tapered ends of the first and second waveguide overlapping, in an example, the first and second waveguides can overlap in spaced parallel or substantially parallel relation; (d) providing an optical fiber positioned in optical alignment with an end of the second waveguide opposite the tapered end; (e) propagating light toward the tapered end of the first waveguide producing evanescent light field that is received by the tapered end of the second waveguide; (f) propagating light received from the evanescent light field by the tapered end of the second waveguide through the second waveguide; and (g) transferring the light propagating through the second waveguide to the optical fiber.

In one preferred and non-limiting embodiment or aspect, the tapered ends of the first and second waveguide overlapping in spaced substantially parallel relation can have their longitudinal axes aligned ±2°. In an example, the optical alignment of step (d) can be within known industry tolerances for optical alignment of the axis of the optical fiber with the axis of the end of the second waveguide opposite the tapered end.

In one preferred and non-limiting embodiment or aspect, the tapered ends of the first and second waveguide can overlap (e.g., lengthwise) by 300 micrometers±30 micrometers.

In one preferred and non-limiting embodiment or aspect, the optical fiber can be disposed on a first substrate having a first end including interconnect nodules, the first waveguide can disposed on a second substrate having a first end including interconnect nodules, and the method can further include positioning the interconnect nodules on the first ends of the first and second substrates in contact with or mating with each other.

Further preferred and non-limiting embodiments or aspects are set forth in the following numbered clauses.

Clause 1: A system comprising: a first substrate having first and second ends, the first substrate including an optical fiber in a groove; a second substrate having first and second ends, the second substrate including a first waveguide having first and second ends, wherein the first end of the second substrate is positioned proximate to the first end of first substrate; and a third substrate having first and second ends, the third substrate including a second waveguide having first and second ends, wherein: the second and third substrates are arranged with the first ends of the first and second waveguides overlapping in spaced parallel or substantially parallel relation; and the first and second substrates are arranged with the second end of the second waveguide in optical alignment with an end face of the optical fiber.

Clause 2: The system of clause 1, wherein: the second waveguide proximate the first end thereof can taper to a rounded point; and the second waveguide proximate the first end thereof can taper to a rounded point.

Clause 3: The system of clause 1 or 2, wherein the first ends of the first and second waveguides can overlap by 300 micrometers±30 micrometers.

Clause 4: The system of any one of clauses 1-3, wherein a center-to-center distance between the overlapping first ends of the first and second waveguides can be less than or equal to 2 micrometers.

Clause 5: The system of any one of clauses 1-4, wherein: the first and second waveguides can be configured whereupon light propagating to the first end of the first or second waveguide forms an evanescent light field that can be received by the first end of the other of the first or second waveguide; and the light from the evanescent light field received by the first end of the other of the first or second waveguide can propagate away from the first end of the other of the first or second waveguide.

Clause 6: The system of any one of clauses 1-5, wherein the third substrate can overlay a part of the first substrate and a part of the second substrate.

Clause 7: The system of any one of clauses 1-6, wherein: the first substrate can include a step having a face where the end face of the optical fiber can be exposed; and at least a part of the second end of the third substrate can abut the face of the step of the first substrate.

Clause 8: The system of any one of clauses 1-7, wherein the groove can be V-shaped.

Clause 9: The system of any one of clauses 1-8, wherein: the first end of the first substrate can include interconnect nodules; the first end of the second substrate can include interconnect nodules; and the interconnect nodules on the first end of the first substrate and the first end of the second substrate can be mated with each other.

Clause 10: The system of any one of clauses 1-9, wherein the interconnect nodules on the first end of the first substrate and the first end of the second substrate can be mated (a) with their end faces abutting, (b) in an interdigitated manner, (c) in a friction fit manner, (d) in an interlocking manner, or (e) some combination of (a)-(d).

Clause 11: The system of any one of clauses 1-10, wherein each interconnect nodule, individually, can be flush with or extend beyond a (vertical) surface (or side) of the first end of the corresponding first or second substrate.

Clause 12: The system of any one of clauses 1-11, wherein the first ends of the first and second waveguides overlapping in spaced substantially parallel relation can have their longitudinal axes aligned ±2°.

Clause 13: The system of any one of clauses 1-12, wherein: the first substrate can include a plurality of optical fibers, each optical fiber can be disposed in a separate groove; the second substrate can include a plurality of first waveguides; and the third substrate can include a plurality of second waveguides.

Clause 14: The system of any one of clauses 1-13, wherein a spacing between adjacent second waveguides can increase toward the second end of the third substrate.

Clause 15: The system of any one of clauses 1-14, wherein the system can further include mating alignment features on at least two of the substrates.

Clause 16: A method comprising: (a) providing a first waveguide having a tapered end; (b) providing a second waveguide having a tapered end; (c) positioning the tapered ends of the first and second waveguide overlapping in spaced parallel or substantially parallel relation; (d) providing an optical fiber positioned in optical alignment with an end of the second waveguide opposite the tapered end; (e) propagating light toward the tapered end of the first waveguide producing evanescent light that is received by the tapered end of the second waveguide; (f) propagating evanescent light received by the tapered end of the second waveguide through the second waveguide; and (g) transferring the light propagating through the second waveguide to the optical fiber.

Clause 17: The method of clause 16, wherein the tapered ends of the first and second waveguide overlapping in spaced substantially parallel relation can have their longitudinal axes aligned ±2°.

Clause 18: The method of clause 16 or 17, wherein the tapered ends of the first and second waveguide can overlap by 300 micrometers±30 micrometers.

Clause 19: The method of any one of clauses 16-18, wherein: the optical fiber can disposed on a first substrate having a first end including interconnect nodules; and the first waveguide can be disposed on a second substrate having a first end including interconnect nodules, wherein the method can further include positioning the interconnect nodules on the first ends of the first and second substrates in contact with or mating with each other.

DESCRIPTION OF THE INVENTION

Figure 1:
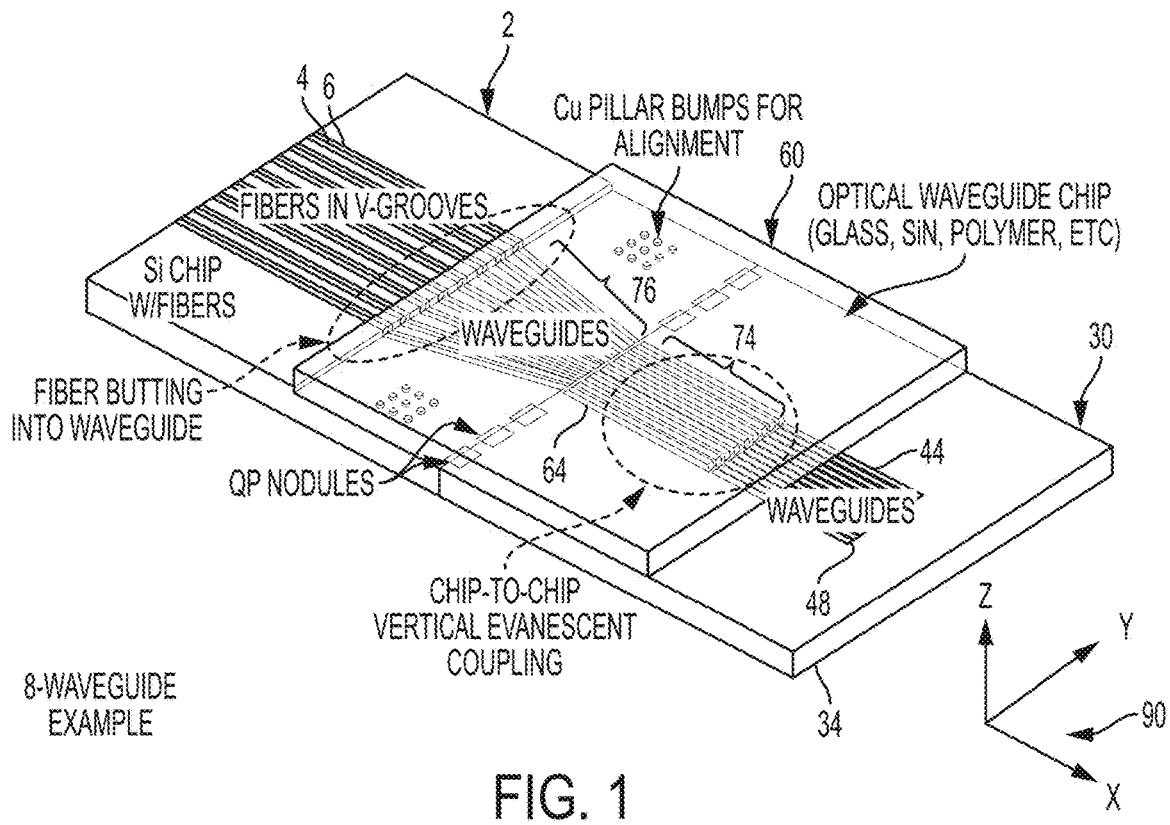
FIGS. 1, 2A, and 2B show assembled (FIG. 1) and exploded perspective views (FIGS. 2A and 2B) of a system for passively aligning and attaching a fiber array to a laser array or optical waveguide array.

Various non-limiting examples will now be described with reference to the accompanying figures where like reference numbers correspond to like or functionally equivalent elements.

For purposes of the description hereinafter, the terms "end," "upper," "lower," "right," "left," "vertical," "horizontal," "top," "bottom," "lateral," "longitudinal," and derivatives thereof shall relate to the example(s) as oriented in the drawing figures. However, it is to be understood that the example(s) may assume various alternative variations and step sequences, except where expressly specified to the contrary. It is also to be understood that the specific example(s) illustrated in the attached drawings, and described in the following specification, are simply exemplary examples or aspects of the invention. Hence, the specific examples or aspects disclosed herein are not to be construed as limiting.

The following US patents are incorporated herein by reference as background art: U.S. Pat. Nos. 5,216,729; 4,466,696; 7,608,919; 7,612,443; 8,021,965; 8,623,700; 9,243,784; 9,316,796; 8,752,283; and 8,534,927.

Figure 2A:
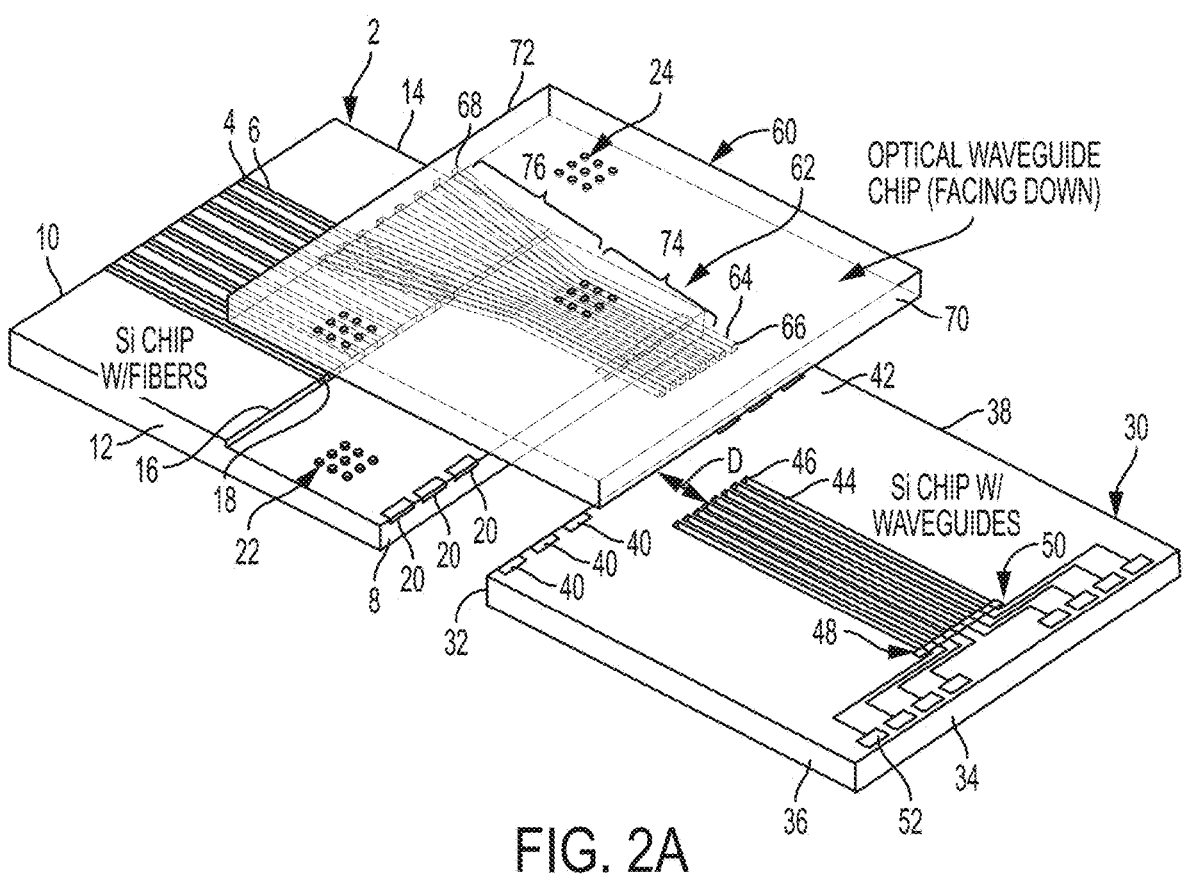
Figure 2B:
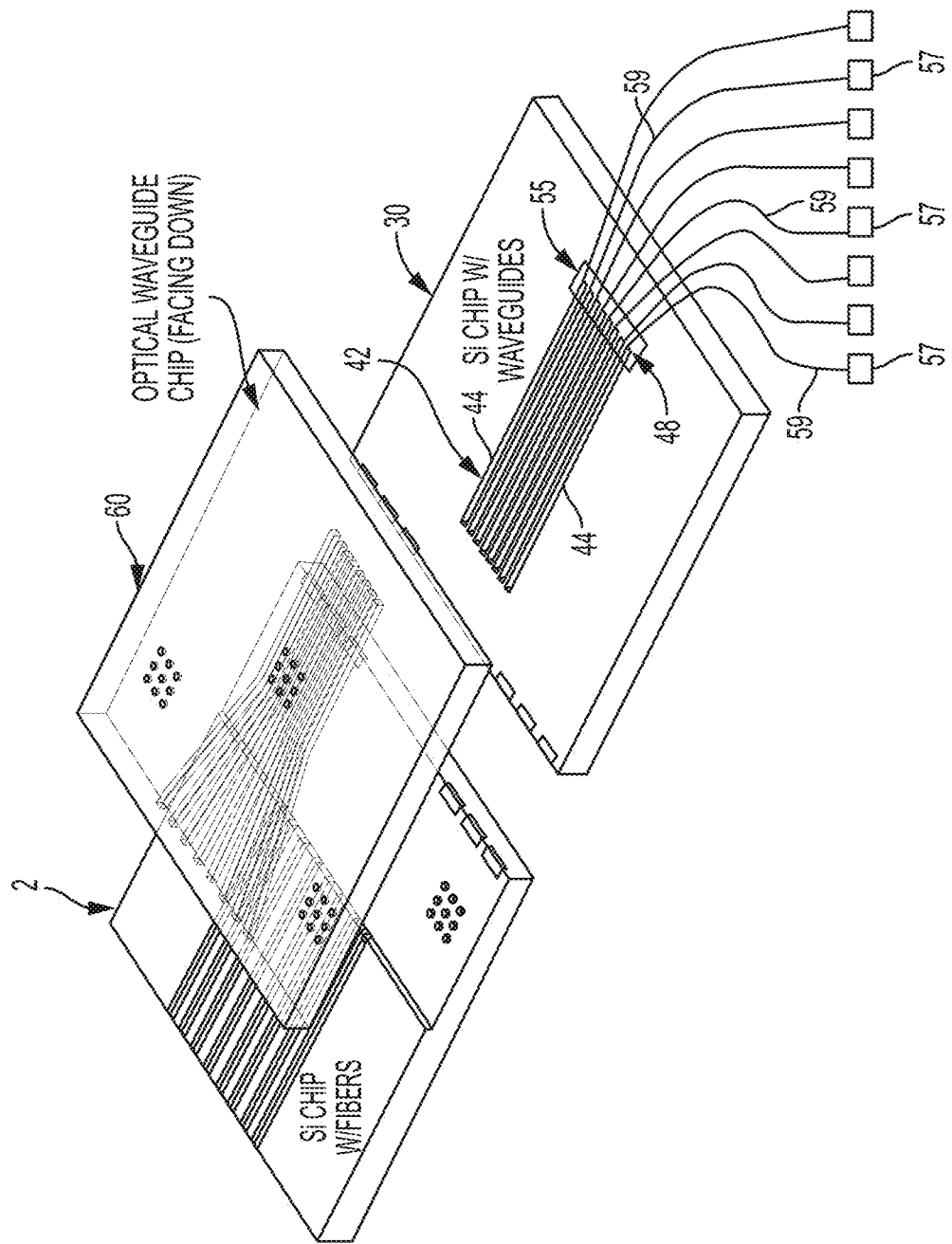

FIGS. 1, 2A, and 2B show assembled (FIG. 1) and exploded perspective views (FIGS. 2A and 2B) of a system for passively aligning and attaching a fiber array to a laser array or optical waveguide array. The system can include three substrates, namely, a first substrate 2 including optical fibers 4 disposed in grooves 6; a second substrate 30 including waveguides 44 formed therein or thereon by conventional wafer fabrication processes; and a third substrate 60 having formed therein or thereon by conventional wafer fabrication processes waveguides 64 which, proximate one end of third substrate 60, said waveguides 64 diverge from each other in a fan-out arrangement.

In an example, first substrate 2 can be formed from semiconductor material, such as, for example, silicon, e.g., a silicon chip, the grooves 6 can be in spaced relation, and the optical fibers 4 can be in spaced relation. For the purpose of description herein, first substrate 2 will be described as being a silicon chip. However, this is not to be construed in a limiting sense since it is envisioned that first substrate 2 can be formed of any suitable and/or desirable material that can be utilized and function in accordance with the intended purpose of and in accordance with the principals described herein. In an example, grooves 6 can be in spaced parallel relation and the optical fibers 4 disposed in said grooves 6 can also be in spaced parallel relation. In an example, each groove can have the shape of a "V" that can be formed by wet chemical etching the silicon forming first substrate 2. The V-shape can be defined by the natural (111) crystal planes of the silicon forming first substrate 2.

In an example, first substrate 2 can include a first end 8, a second end 10, a first side 12, and a second side 14. Running between first side 12 and second side 14 intermediate first end 8 and second end 10, first substrate 2 can include a step 16 between a higher elevation proximate second end 10 and a lower elevation proximate first end 8. Step 16 can be of sufficient height whereupon end faces 18 of optical fibers 4 are exposed.

First end 8 of first substrate 2 can include a number of quilt package (QP) nodules 20, also known as interconnect nodules. QP nodules (or interconnect nodules) are well known in the art as shown, for example, in U.S. Pat. No. 8,623,700 incorporated herein by reference. Accordingly, details regarding QP nodules and/or their formation will not be described further herein.

The end of each QP nodule 20 facing the same direction as first end 8 of first substrate 2 can either be flush with the surface of first end 8 or can extend beyond (cantilevered over) the surface of first end 8.

Finally, first substrate 2 can include one or more sets of optional alignment features 22 configured to mate, mesh, or interact with a corresponding set of optional alignment features 24 of a third substrate 60 described in greater detail hereinafter.

In an example, second substrate 30 can include a first end 32, a second end 34, a first side 36, and a second side 38. First end 32 of second substrate 30 can include a number of QP nodules 40. In an example, QP nodules 40 can be arranged in a mirror image or mating pattern to QP nodules 20 of first substrate 2, whereupon when first end 8 of first substrate 2 and first end 32 of second substrate 30 are brought together, QP nodules 20 and 40 of said substrates contact (abut) or mate with each other.

In an example, QP nodules 20 and 40 can be designed to mate. In one example, QP nodules 20 and 40 can be configured to mate in an interdigitated manner. In another example, QP nodules 20 and 40 configured to mate in an interdigitated matter can also be configured to friction fit, e.g., a QP nodules 20 (or 40) can friction fit between a pair of adjacent QP nodules 40 (or 20).

In yet another example, QP nodules 20 and 40 can include complimentary mating features that, in an example, can mate in an interlocking manner. For example, one or more QP nodules 20 (or 40) can include a projection having a first shape/configuration and one or more QP nodules 40 (or 20) can have an aperture having a second shape/configuration that is complimentary to the first shape/configuration. In an example, the complimentary first and second shapes can couple together, for example, in a friction fit manner.

Second substrate 30 can be formed from semiconductor material, such as, for example, silicon, e.g., a silicon chip, with a surface coupling waveguide array 42 that can include a plurality of individual waveguides 44 formed in the bulk of second substrate 30. For the purpose of description herein, second substrate 30 will be described as being a silicon chip. However, this is not to be construed in a limiting sense since it is envisioned that second substrate 30 and the waveguides 44 thereof can be formed of any suitable and/or desirable material that can be utilized and function in accordance with the intended purpose of and in accordance with the principals described herein. Each waveguide 44 can be a silicon-based waveguide created during the fabrication of second substrate 30, in the form of a silicon chip, using conventional semiconductor fabrication processes known in the art. In an example, the center-to-center spacing between adjacent pairs of waveguides 44 can be between 10-20 micrometers. However, this is not to be construed in a limiting sense. In an example, the center-to-center spacing between adjacent pairs of waveguides 44 are the same within some predetermined tolerance, e.g., ±0.5 micrometers. However, this is not to be construed in a limiting sense.

In an example, waveguides 44 can be positioned in spaced relation and can extend between first end 32 and second end 34 of second substrate 30, with each waveguide 44 including a first end 46 and a second end 48. In an example, first end 46 of each waveguide 44 can be spaced a distance D from first end 32 of second substrate 30. In another example, the first end 46 of each instance of waveguide 44 can be spaced a different distance from first end 32.

In an example shown in FIG. 2A, the second end 48 of each waveguide 44 can be coupled to a laser 50 formed in second substrate (formed of, for example, silicon) using semiconductor fabrication processes known in the art. Each laser 50 can be excited with electrical energy supplied, for example, via a bonding pad 52 (shown) or a QP nodule (not shown) in a manner known in the art to produce said laser light. Laser light produced by each laser 50 can propagate from second end 48 toward first end 46 of the corresponding waveguide 44. In another example, each laser 50 can be mounted on second substrate 30. Where lasers 50 are mounted on second substrate 30, electrical energy can optionally be supplied directly to said lasers thereby avoiding the need for a bonding pad and related electrical interconnects to be formed on second substrate 30.

FIG. 2B shows another example which is similar in most respects to the example shown in FIG. 2A except that lasers 50, bonding pads 52, and related interconnects are omitted and replaced with a coupler or couplers 55 between the second ends 48 of waveguides 44 and off-board lasers 57 which are coupled to said waveguides 44 via optical fibers 59 and coupler or couplers 55.

The use of a coupler or couplers 55 to couple optical fibers 59 to waveguides 44 is well known in the art. In one non-limiting example, coupler or couplers 55 can be an external grating-structured collimating gradient-index (GRIN) lens wherein laser light emerging from an optical fiber 59 is expanded and collimated by the GRIN lens. The exit face of the GRIN lens is disposed at an angle relative to the propagation direction of the laser light and is polished and structured with a high-frequency grating. When the exit face of the collimating lens of coupler or couplers 55 is placed in close proximity or in contact with a surface of a waveguide 44, a part of the collimated laser light beam can be coupled to and guided by said waveguide 44. The description of coupler or couplers 55 as being a GRIN lens is not to be construed in a limiting sense since it is envisioned that any suitable and/or desirable coupler or couplers 55 known in the art or hereinafter developed can be used to couple laser light from an optical fiber 59 to a waveguide 44.

The first end 46 of each waveguide 44 can include a laser sink (not shown) for receiving laser light input into second end 48 of said waveguide 44 in order to dissipate said laser light and the heat produced thereby.

Third substrate 60 can be made from glass, silicon nitride on silicon, polymer, or any other suitable and/or desirable optical grade material. Third substrate 60 can include a waveguide array 62 that includes a plurality of waveguides 64 formed thereon in a manner known in the art. Each waveguide 64 includes a first end 66 and a second end 68.

Each waveguide 64 of waveguide array 62 can extend from a first end 70 of third substrate 60 toward a second end 72 of third substrate 60. In an example, a first part 74 of waveguide array 62 proximate first end 70 includes a number of waveguides 64 in spaced relation. In an example, the plurality of waveguides 64 along first part 74 of waveguide array 62 can be in spaced parallel relation.

In an example, a second part 76 of waveguide array 62 proximate second end 72 can include the plurality of waveguides 64 in a fan-like pattern, wherein the spacing between adjacent waveguides 64 increases from first part 74 toward second end 72.

In an example, the center-to-center spacing between adjacent pairs of optical fibers 4 of first substrate 2 is between 125-250 micrometers; the center-to-center spacing between adjacent pairs of waveguides 44 of second substrate 30 is between 10-20 micrometers; the center-to-center spacing between adjacent pairs of waveguides 64 along the first part 74 of waveguide array 62 is between 10-20 micrometers; and the center-to-center spacing between adjacent pairs of waveguides 64 at second end 72 of third substrate 60 is between 125-250 micrometers. However, the foregoing dimensions are not to be construed in a limiting sense since it is envisioned that the center-to-center spacing between adjacent pairs of optical fibers 4, waveguides 44, and waveguides 64 (including the spacing proximate first part 74 and second part 76 of waveguide array 62) can be chosen to be any suitable and/or desirable dimension consistent with the intended purpose of and in accordance with principals for the first through third substrates 2, 30, and 60 described herein. For example, the center-to-center spacing of each pair of adjacent waveguides 44 and each pair of adjacent waveguides 46 can be the same as the center-to-center spacing of optical fibers 4. Hence, in this example, the fan-out of the waveguides 64 of the second part 76 of waveguide array 62 proximate second end 72 can be omitted.

In the completed assembly of the system shown in FIG. 1, first end 8 of first substrate 2 and first end 32 of second substrate 30 can be abutted together or can be in spaced relation (the latter occurring when one or more of QP nodules 20 and 40 extend in a cantilevered manner beyond the face of first end 8 of first substrate 2 and the face of first end 32 of second substrate 30, respectively) with one or more QP nodules 20 abutting or mating with one or more corresponding QP nodules 40. In an example, optional alignment features 22 of first substrate 2 and optional alignment features 24 of third substrate 60 can be mating alignment features that facilitate accurate alignment of third substrate 60 to first substrate 2 and second substrate 30. In an example, the set of alignment features 24 can be one or more pillars or posts and the set of alignment features 22 can be a set of mating apertures, each of which is configured to receive at least one pillar or post. In an example, the pillars or posts can be formed of a metal, such as, without limitation, copper. However, this is not to be construed in a limiting sense since it is envisioned that alignment features 22 and 24 can be formed of any suitable and/or desirable material and alignment features 22 and 24 can be of any suitable and/or desirable form, shape, or design that facilitate alignment of first substrate 2 and third substrate 60.

In an example, at least the lower part (in the view shown in FIGS. 1, 2A, and 2B) of second end 72 of third substrate 60 can abut the vertical face of step 16 of first substrate 2 when third substrate 60 is mated with first substrate 2.

In the example finished assembly shown in FIG. 1, the surface of third substrate 60 that includes waveguide array 62 formed therein can bridge the abutment or spaced relation of first end 8 of first substrate 2 and first end 32 of second substrate 30. Also, at least portions of the waveguides 64 of first part 74 of waveguide array 62 can be in vertical or substantially vertical alignment positioned over at least portions of the waveguides 44 of waveguide array 42 proximate first end 32 of second substrate 30. The face of one or more waveguides 64 of waveguide array 62 at second end 68 of third substrate 60 can be aligned with or in optical alignment with, e.g., abutting or in spaced relation with, one or more end faces 18 of optical fibers 4 in grooves 6 of first substrate 2. In an example, the face at the second end 68 of each waveguides 64 can be aligned with or in optical alignment with an end face 18 of a single optical fiber 4 in a groove 6.

An example use of the system shown in FIG. 1 will now be described. For simplicity, the use of a single laser 50 or 57 outputting laser light down a single waveguide 44 and the response thereto of a waveguide 64 in vertical or substantially vertical alignment with said waveguide 44, and the response of an optical fiber 4 in alignment with a second end 68 of said waveguide 64 will be described. However, this is not to be construed in a limiting sense.

In response to a laser 50 or 57 outputting laser light into a second end 48 of a waveguide 44, said laser light propagates along waveguide 44 and evanescent light is produced laterally to the axis of waveguide 44 proximate first end 46 of said waveguide 44. This evanescent light is received, at least in part, by a waveguide 64, proximate first end 66 of said waveguide 64, in vertical or substantially vertical alignment with said waveguide 44. The evanescent light received in waveguide 64 propagates in waveguide 64 from first end 66 to second end 68 of said waveguide 64. Light travelling in waveguide 64 exits second end 68 of waveguide 64 and is received in the end face 18 of an optical fiber 4 aligned with, in an example, abutted against, or in optical alignment with second end 68 of waveguide 64. Light entering the face 18 of optical fiber 4 propagates in said optical fiber 4 in a direction toward second end 10 of first substrate 2 for use in a system (not shown) coupled to the end of optical fiber 4 opposite face 18 of optical fiber 4. Hence, as can be seen, laser light output by a laser 50 or 57 propagates to an end of an optical fiber 4 proximate second end 10 of first substrate 2 via a waveguide 44 and a waveguide 64 in vertical or substantially vertical alignment with said waveguide 44.

It is estimated that the coupling efficiency between a waveguide 64 in vertical or substantially vertical alignment with a waveguide 44 can be greater than 90% when said waveguides 44 and 64 are within one micrometer of each other, and greater than 73% when said waveguides 44 and 64 are within two micrometers of each other. In an example, the foregoing coupling efficiencies were modeled for a waveguide 44 and a waveguide 64 in spaced vertical alignment with each other separated by a center-to-center distance of one micrometer for coupling efficiency greater than 90%, and a center-to-center distance of two micrometers for coupling efficiency greater than 73%.

The following Table 1 shows examples of measured average TE and TM insertion losses (in dB) at various interface locations of an actual assembled system of the type shown in FIG. 1.

TABLE I

Average Insertion Loss in dB [λ = 1500-1600 nm]

| Interface | TE (SiN—SiN) | TE-Index Match | TM (SiN—SiN) | TM-Index Match | TE (SiN—Si) | TM (SiN—Si) |
|---|---|---|---|---|---|---|
| Butt-Coupling interface of a fiber 4 to a waveguide 64 at step 16 of first substrate 2 | −0.99 | −0.99 | −0.66 | −0.69 | −0.99 | −0.61 |
| QP Nodule Gap—where first end 8 of first substrate 2 abuts or is spaced from first end 32 of second substrate 30 | −0.06 | −0.00 | −0.68 | −0.13 | −0.06 | −0.61 |
| Evanescent Coupling between a waveguide 64 and a waveguide 44 | −0.29 | −0.29 | −0.39 | −0.46 | −0.2 | −0.24 |
| TOTAL [dB]: | −1.34 | −1.28 | −1.73 | −1.29 | −1.25 | −1.46 |

In an example, to help reduce insertion loss, index matching material known in the art can be disposed at (1) the interface (or butt-coupling) of a fiber 4 to a waveguide 64 by step 16 and/or (2) where first end 8 of first substrate 2 abuts or is spaced from first end 32 of second substrate 30.

In an example, the largest lateral dimension of waveguide 44 can be the same as the largest lateral dimension of the portion of waveguide 64 in vertical or substantially vertical alignment with said waveguide 44. Moreover, in an example, the shape of the second end 68 of each waveguide 64 at second end 72 of third substrate 60 can be circular in shape to match the circular shape of the core of the end face 18 of the optical fiber 4 aligned with, and desirably abutted, against the second end 68 of waveguide 64. The shape-matching of the aligned end faces of optical fiber 4 and waveguide 64 facilitates coupling between optical fibers 4 and waveguides 64.

Regarding the shape of waveguide 44 between first part 74 of waveguide array 62 and second part 76, the portion of each waveguide 64 forming second part 76 of waveguide array 62 can change shape and dimensions between the transition between first part and second part 74, 76 of waveguide array 62 and second end 72 of third substrate 60. In other words, moving from first part 74 of waveguide array 62 toward second end 72 of third substrate 60, each waveguide 64 can change shape and/or dimensions to facilitate the transition between the shapes of waveguides 44 of waveguide array 42 and optical fibers 4 of first substrate 2.

Having thus described the example systems shown in FIGS. 1, 2A, and 2B, an example method of assembling first, second, and third substrates 2, 30, and 60 into the assembled system shown in FIG. 1 will now be described with reference to FIGS. 4-8B. It is to be appreciated, however, that the following description is exemplary only and is not to be construed in a limiting sense.

Figure 4:
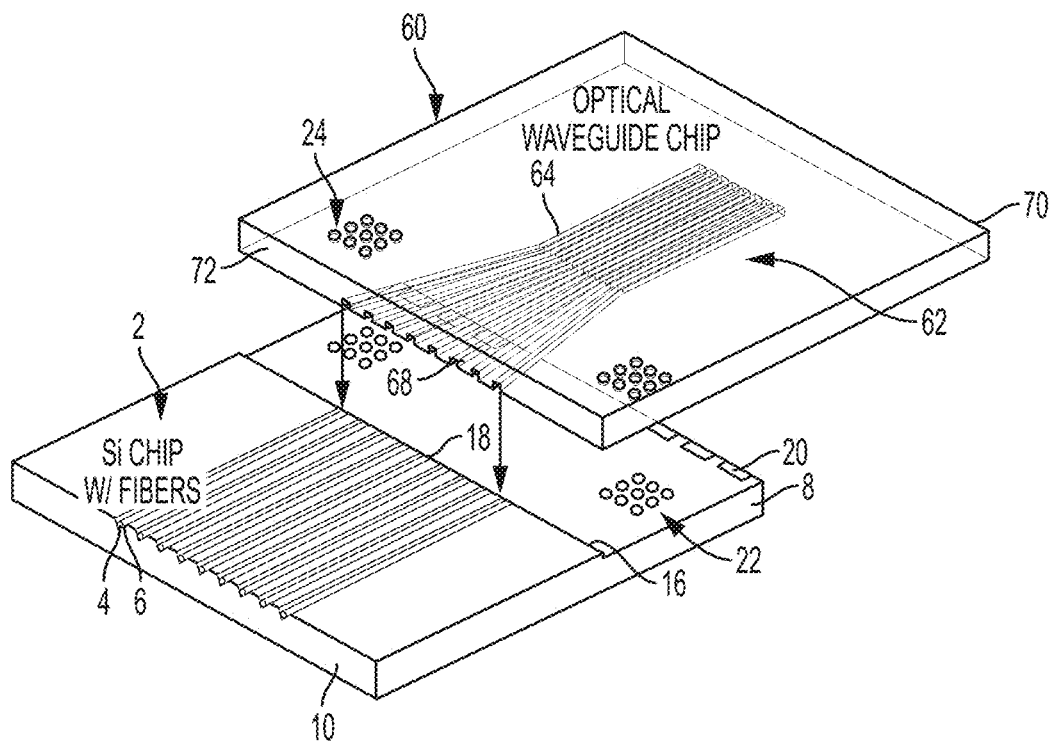
FIG. 4 is an exploded perspective view of the pre-assembled first and third substrates of FIG. 1.

With reference to the exploded perspective view shown in FIG. 4, in an example, first substrate 2 and third substrate 60 can be joined with at least the lower portion (in the perspective view shown in FIG. 4) of second end 72 of third substrate 60 abutted against the vertical face of step 16 of first substrate 2 and with second ends 68 of waveguides 64 aligned with, and, in an example, abutting end faces 18 of optical fibers 4.

In an example, to facilitate this alignment between second ends 68 of waveguides 64 and end faces 18 of optical fibers 4, waveguides 64 can be positioned on or in the downward facing surface of third substrate 60 in the perspective view shown in FIG. 4.

Optional alignment features 22 and 24 can be provided on first substrate 2 and third substrate 60 as an aid in aligning the second ends 68 of waveguides 64 to the end faces 18 of optical fibers 4 at step 16.

In an example, a high precision die bonder can acquire third substrate 60 from a carrier pack and invert it so that the surface of third substrate 60 where waveguide array 62 is formed faces downward. The die bonder can also pick-up first substrate 2, including one or more grooves 6 and, in an example, one or more optical fibers 4 in said one or more grooves 6, and place it on a heating stage as a substrate to receive third substrate 60. The die bonder can then transfer third substrate 60 on top of first substrate 2 as shown in FIG. 4 to produce the assembly 2, 60 shown in the assembled perspective view of FIG. 5.

Figure 5:
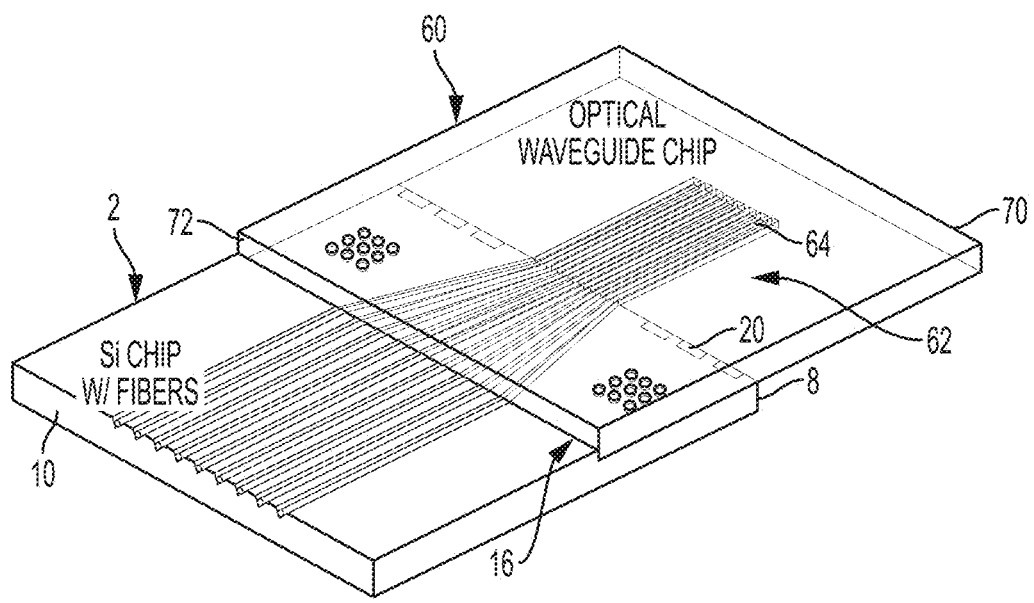
FIG. 5 is an assembled view of the first and third substrates shown in FIG. 4.

First substrate 2 including third substrate 60 positioned thereon in the manner shown in FIG. 5 can be bonded together in any suitable and/or desirable manner known in the art. In an example, the set of alignment features 24 and the set of alignment features 22 can be made of materials having a low eutectic point, whereupon heating the assembly shown in FIG. 5 can bond first and third substrates 2, 60 together in the manner shown in FIG. 5. In another example, epoxy can be dispensed between the mating surfaces of first and third substrates 2, 60, desirably away from waveguide array 62 and step 16. This epoxy can then be subsequently cured in any suitable and/or desirable manner, e.g., by exposure to UV light, when a UV curable epoxy is used, or by the application of heat, when a heat curable epoxy is used.

Figure 6:
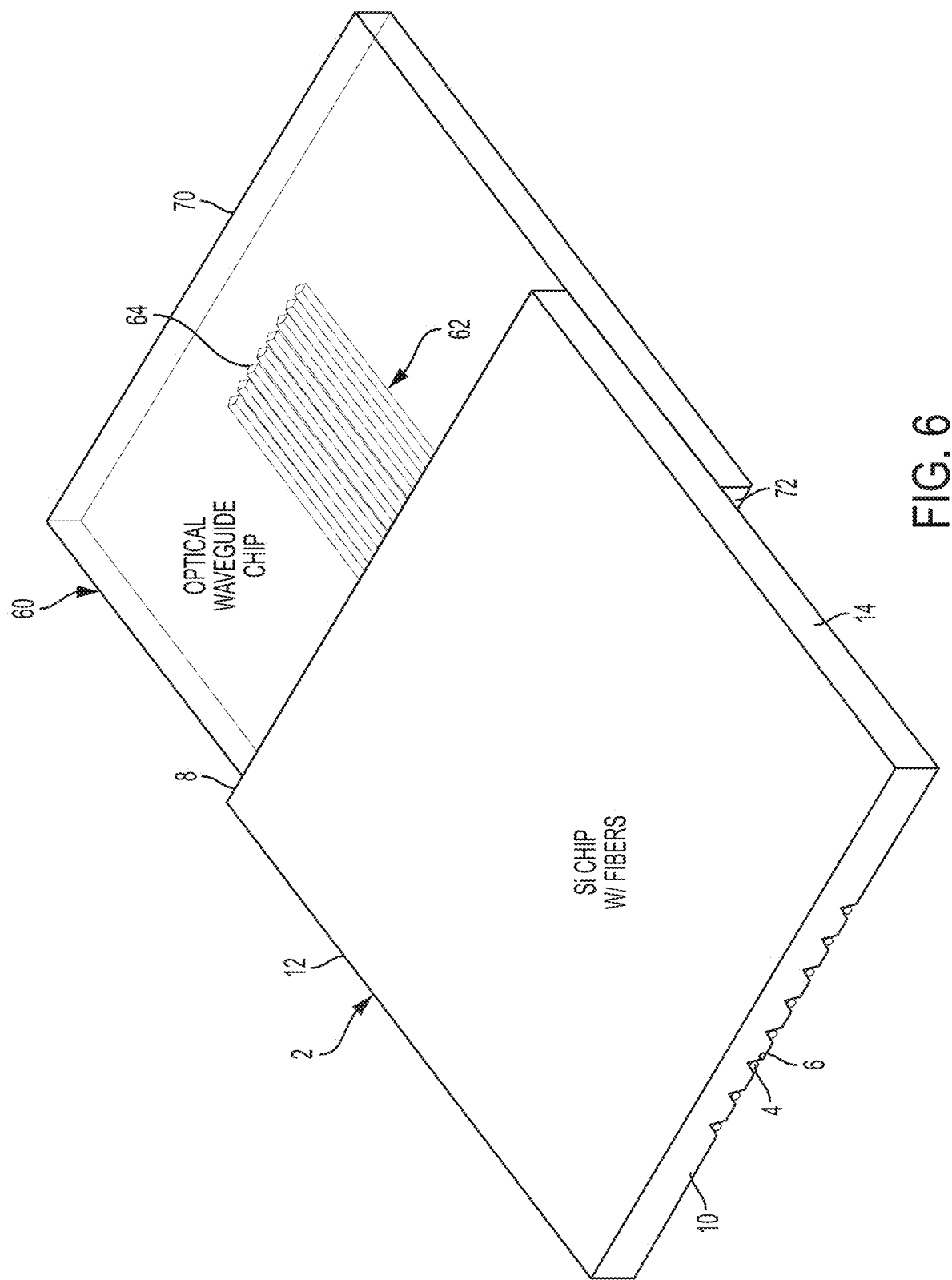
FIG. 6 is an inverted view of the assembled first and third substrates shown in FIG. 5.

With reference to the assembled perspective view of FIG. 6, the assembly of the first and third substrates 2 and 60 shown in FIG. 5 can then inverted whereupon the waveguides 64 of waveguide array 62 of third substrate 60 face upward, as shown in FIG. 6.

Figure 7A:
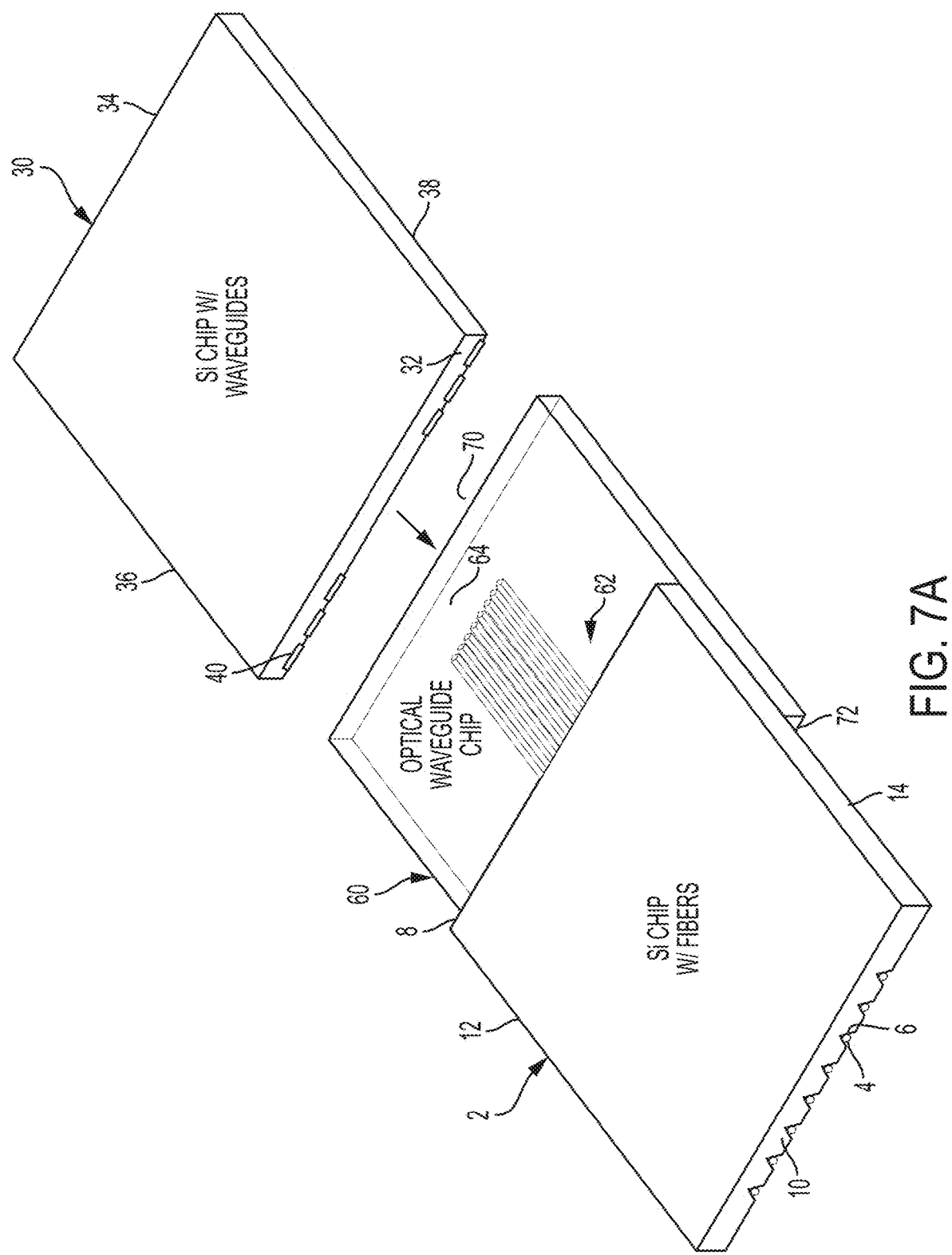
FIGS. 7A and 7B show partially assembled bottom side and top side perspective views of the first, second, and third substrates of FIG. 1 after the first and third substrates have been assembled in the manner shown in FIG. 6.
Figure 7B:
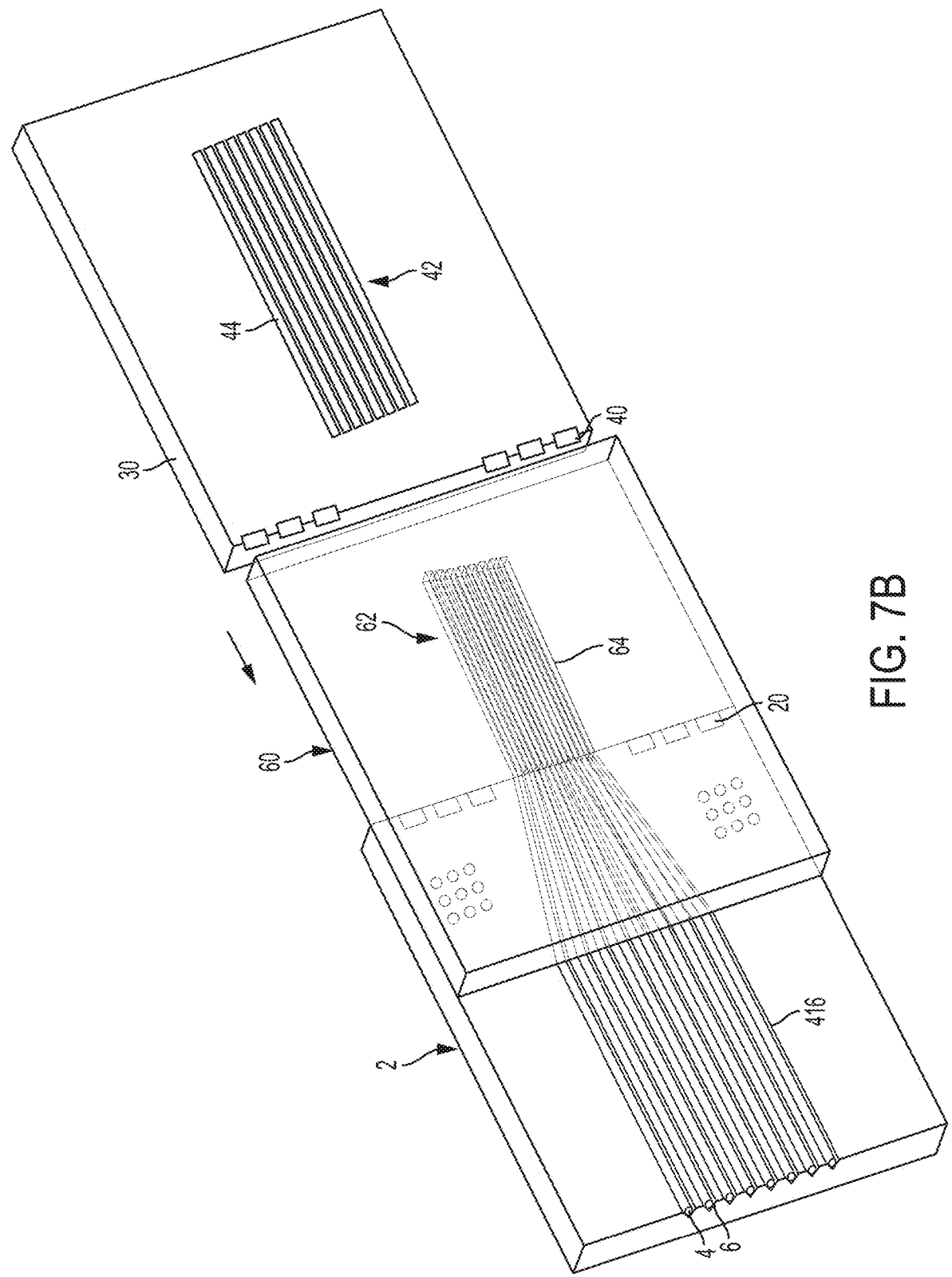

FIGS. 7A and 7B show partially assembled bottom side and top side perspective views of first, second, and third substrates 2, 30, and 60, respectively, after first and third substrates 2 and 60 have been joined in the manner shown in FIGS. 5 and 6. As shown in FIGS. 7A and 7B, first end 32 of second substrate 30 (with the surface that includes waveguide array 42 facing down in the view shown in FIG. 7A) is moved into position abutting or in spaced relation to first end 8 of first substrate 2 with QP nodules 40 and 20 of second and first substrates 30 and 2, respectively, in contact and/or mating, and with waveguides 44 of waveguide array 42 in vertical or substantially alignment with waveguides 64 of waveguide array 62. Herein, "vertical or substantially vertical alignment" means alignment of waveguides 64 and waveguides 44 in the Z direction shown in the Cartesian coordinate system diagram 90 shown in FIG. 1 within ±2 micrometers off vertical in the Y direction or within ±5° of vertical.

Figure 8A:
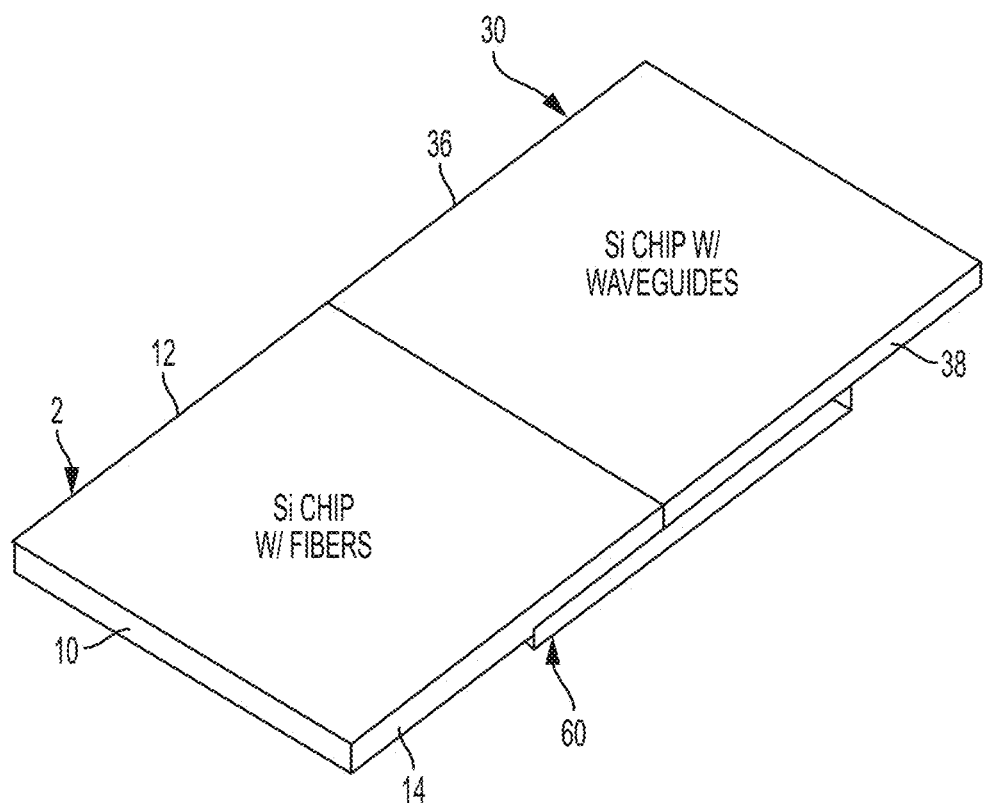
FIGS. 8A and 8B shown bottom side and top side perspective views of the first, second, and third substrates shown in FIGS. 7A-7B after assembly.
Figure 8B:
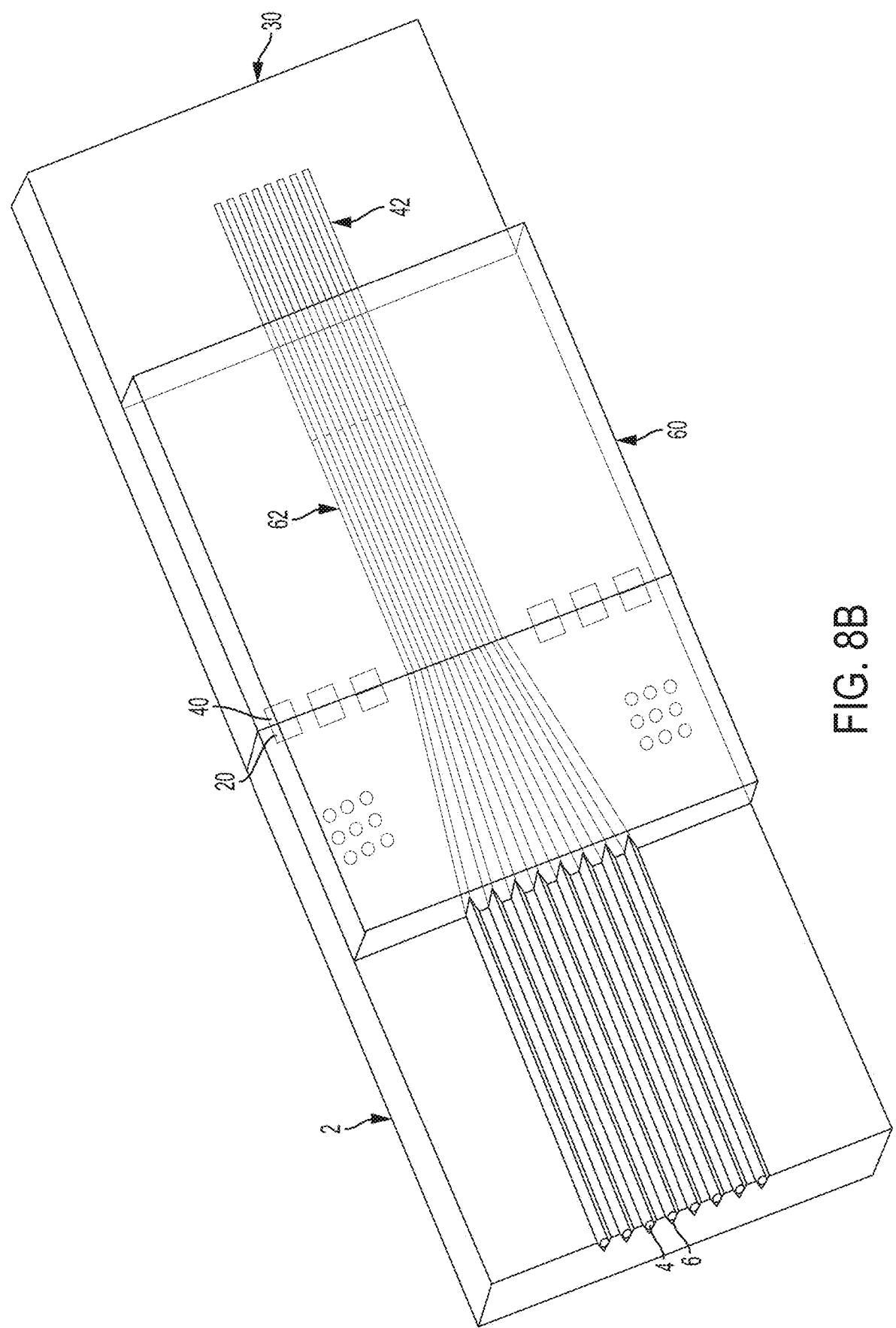

Bottom side and top side perspective views of the completed assembly of first, second, and third substrates 2, 30, and 60 are shown in FIGS. 8A and 8B, respectively.

Equipment utilized to assemble first, second, and third substrates 2, 30, and 60 can include any suitable and/or desirable equipment currently known in the art or developed hereinafter. In an example, die bonders including suitable chucks or stages can be utilized to pick, maneuver, orient, and place substrates 2, 30, and 60 to form the assembly shown in FIGS. 8A and 8B.

Referring back to FIGS. 1, 2A, and 2B, as can be seen, the completed assembly of first, second, and third substrates 2, 30, and 60 includes first end 8 of first substrate 2 abutting or in spaced relation with first end 32 of second substrate 30, with QP nodules 20 and 40 in contact or mating. In an example, QP nodules 20 and 40 aid in controlling angular variations and alignment along the length (or X) direction of waveguides 44 of waveguide array 42 and waveguides 64 of the first part 74 of waveguide array 62.

The surface of third substrate 60 including at least a portion of the second part 76 of waveguide array 62 is in contact with the stepped-down or lower surface of first substrate 2, i.e., the surface of first substrate 2 that does not include optical fibers 4 and grooves 6, proximate first end 8. At the same time, the surface of third substrate 60 that includes at least a portion of the first part 74 of waveguide array 62 is in contact with the surface of second substrate 30 that includes at least a portion of waveguide array 42 proximate first end 32 of second substrate 30.

In the example shown in FIG. 1, the surface of third substrate 60 that includes waveguide array 62 is covered by or covers portions of first and second substrates 2 and 30. In contrast, only the portions of first and second substrates 2 and 30 proximate QP nodules 20 and 40 are covered by or cover the surface of third substrate 60.

The example of assembling first, second, and third substrates 2, 30, and 60 discussed above in connection with FIGS. 4-8B is not to be construed in a limiting sense since it is envisioned that said substrates can be assembled to the form shown in FIGS. 8A and 8B in any suitable and/or desirable manner. In an example, first end 8 of first substrate 2 and first end 32 of second substrate 30 can be abutted together or fixed in spaced relation with OP nodules 20, 40 abutting followed by placement of third substrate 60 over first substrate 2 abutted to or in spaced relation to second substrate 30 in the manner shown in FIG. 1.

The assembly of first, second, and third substrates 2, 30, and 60 can be bonded together in any suitable and/or desirable manner. In an example, an epoxy (UV curable or heat curable) can be utilized. In an example, an epoxy can be disposed between the facing surfaces of first substrate 2 and third substrate 60, and between the facing surfaces of second substrate 30 and third substrate 60 in the assembled view shown in FIGS. 1, 8A, and 8B. In an another example, thermal surface bonding can be utilized to join first, second, and third substrates 2, 30, and 60 via pre-deposited layers of, for example, $SiO^2$ on each substrate. In yet another example, laser-assisted soldering can be utilized to join first, second, and third substrates 2, 30, and 60. Combinations of thermal surface bonding via pre-deposited layers (such as $SiO^2$), epoxy (UV or heat curable), and or laser-assisted soldering can also be utilized to join first, second, and third substrates 2, 30, and 60 in the manner shown in FIGS. 1, 8A, and 8B.

Figure 3A:
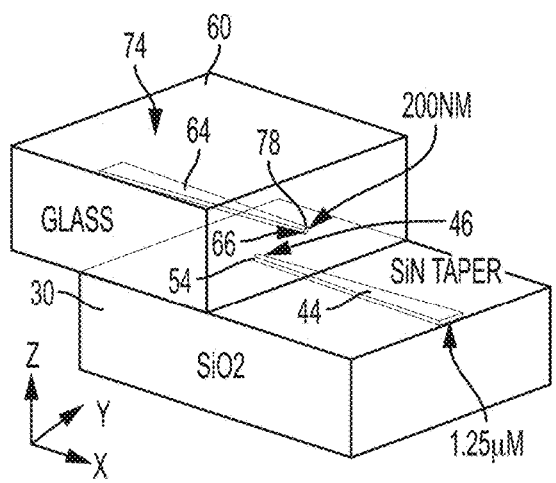
FIG. 3A is a perspective view of isolated portions of the second and third substrates of FIG. 1 showing the overlap and alignment of the tapered first ends of the waveguides of the second and third substrates.

Referring now to FIGS. 2A, 2B, and 3A-3D, approaching first end 32 of second substrate 30, the material forming each waveguide 44 can taper from a full lateral width (in the Y direction) to a rounded point 54 (FIG. 3A) at first end 46 of said waveguide 44. Similarly, proximate first end 66, each waveguide 64 can be tapered and have a rounded point 78. Moving in a direction away from first end 66, waveguide 64 can taper outwardly to its full lateral width (in the Y direction) for the remainder of first part 74 of waveguide array 62 (FIG. 3A).

Figure 3B:
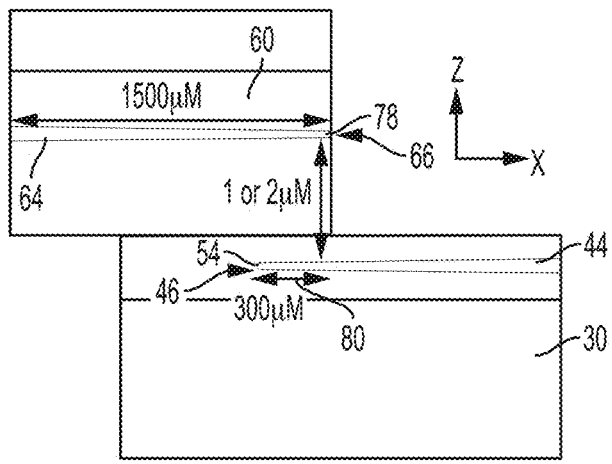
FIG. 3B is a sectional view of the overlapping tapered first ends of the waveguides of the second and third substrates shown in FIG. 3A.
Figure 3C:
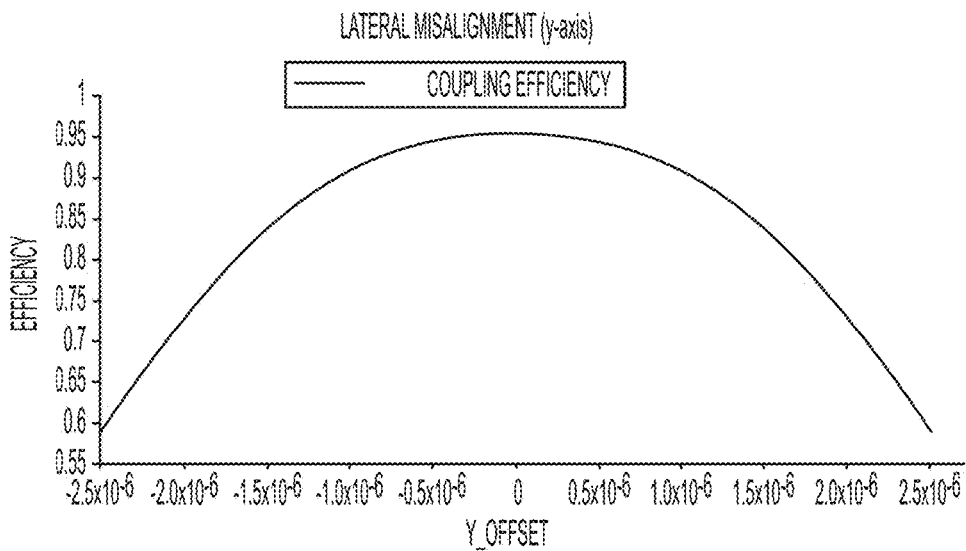
FIG. 3C is a graph of efficiency (of evanescent light coupling) vs. Y-offset for the overlapping tapered first ends of the waveguides shown in FIG. 3B.
Figure 3D:
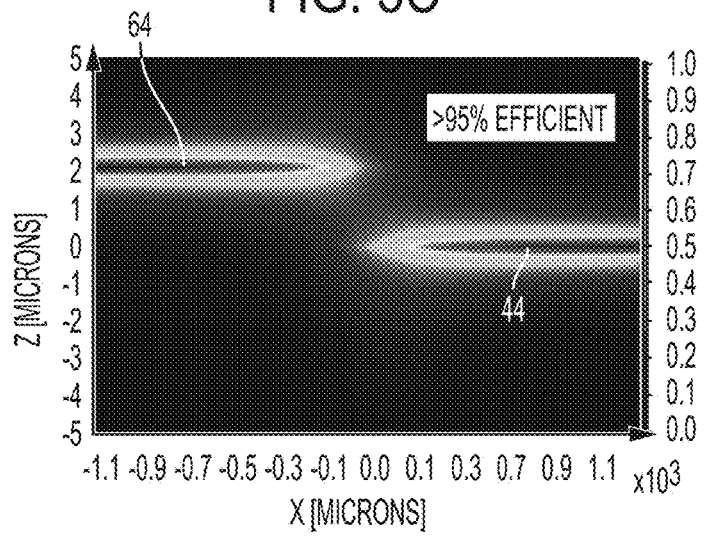
FIG. 3D is a view of an evanescent light field and coupling of the evanescent light field produced by the overlapping tapered first ends of the waveguides shown in FIG. 3B in response to input of laser light into one of the waveguides.

In an example, each waveguide 44 proximate first end 46 thereof and each waveguide 64 proximate first end 66 thereof in vertical or substantially alignment with said waveguide 44 can overlap each other by 300 micrometers±30 micrometers (FIG. 3B). This overlap is shown in FIG. 3B by reference number 80. However, this is not to be construed in a limiting sense.

In an example, the lateral width (in the Y direction shown in FIG. 3A) of the tapered part of waveguide 44 25-100 micrometers away from the tip of rounded point 54 can be less than ½ or ¼ of the largest width in the Y direction of the body of waveguide 44 away from the tapered part of waveguide 44. In another example, the lateral width (in the Y direction shown in FIG. 3A) of the tapered part of waveguide 64 25-100 micrometers away from the tip of rounded point 78 of waveguide 64 can be less than ½ or ¼ of the largest width in the Y direction of the body of waveguide 64 away from the tapered part of waveguide 64. In other words, the width (in the Y direction) of the un-tapered portion of waveguide 44 can be 2-4 times greater than the width (in the Y direction) of the tapered part of waveguide 44 25-100 micrometers way from the tip of rounded point 54. In another example, the width (in the Y direction) of the un-tapered portion of waveguide 64 can be 2 or 4 times greater than the width (in the Y direction) of the tapered part of waveguide 64 25-100 micrometers way from the tip of rounded point 78.

In an example, the largest thickness (or height) of waveguide 44 in the Z direction (shown in FIG. 3A) is 1.25 micrometers and the largest thickness (or height) of waveguide 64 in the Z direction is 200 nanometers. However, this is not to be construed in a limiting sense.

The tapered portion of each waveguide 44 facilitates the formation of an evanescent light field in response to laser light propagating in waveguide 44 towards first end 46. When the tapered portion of a waveguide 64 is positioned in vertical or substantially vertical alignment (Z) alignment (±2 micrometers off vertical in the Y direction) with the tapered portion of waveguide 44, and with the longitudinal axes of waveguides 46 and 64 parallel or substantially parallel, ±2° of parallel, the evanescent light field can be received in the taper portion of waveguide 64 proximate first end 66 thereof for continued propagation of the received light to second end 68 of waveguide 64 for transfer to an optical fiber 4 having an end face 18 aligned with said second end 68.

As can be seen, disclosed is a method and system for passively aligning optical fibers 4, waveguide array 62, and waveguide array 42 using chip-to-chip vertical evanescent optical waveguides 44 and 64, that can be used with fully automated die bonding equipment. It is expected that the assembly 2, 30, and 60 can achieve high optical coupling and high process throughput for needs of high volume manufacturing of photonics, silicon photonics, and other applications that need to align optical fibers to lasers efficiently.

Also disclosed herein is a system comprising: a first substrate having first and second ends, the first substrate includes an optical fiber in a groove; a second substrate having first and second ends, the second substrate includes a first waveguide having first and second ends, wherein the first end of the second substrate is positioned proximate to the first end of first substrate; a third substrate having first and second ends, the third substrate includes a second waveguide having first and second ends, wherein: the second and third substrates are arranged with the first ends of the first and second waveguides overlapping in spaced parallel or substantially parallel relation; and the first and second substrates are arranged with the second end of the second waveguide in optical alignment with an end face of the optical fiber.

The second waveguide proximate the first end thereof can taper to a point, e.g., a rounded point. The second waveguide proximate the first end thereof can taper to a point, e.g., a rounded point.

The first ends of the first and second waveguides can overlap by 300 micrometers±30 micrometers.

A center-to-center distance between the overlapping first ends of the first and second waveguides can be less than or equal to 2 micrometers.

The first and second waveguides can be configured whereupon light propagating to the first end of the first or second waveguide forms an evanescent light field that can be received by the first end of the other of the first or second waveguide. The evanescent light field received by the first end of the other of the first or second waveguide can propagate away from the first end of the other of the first or second waveguide.

The third substrate can overlay a part of the first substrate and a part of the second substrate.

The first substrate can include a step having a face where the end face of the optical fiber can be exposed. At least a part of the second end of the third substrate can abut the face of the step of the first substrate.

The groove can be V-shaped.

The first end of the first substrate can include interconnect nodules. The first end of the second substrate can include interconnect nodules. The interconnect nodules on the first end of the first substrate and the first end of the second substrate can be mated with each other.

The interconnect nodules on the first end of the first substrate and the first end of the second substrate can be mated (a) with their end faces abutting, (b) in an interdigitated manner, (c) in a friction fit manner, in (d) an interlocking manner, or some combination of (a)-(d).

Each interconnect nodule, individually, can be flush with or extend beyond a surface of the first end of the corresponding first or second substrate.

The first ends of the first and second waveguides can overlapping in spaced substantially parallel relation can have their longitudinal axes aligned ±2°.

The first substrate can include a plurality of optical fibers, each optical fiber disposed in a separate groove. The second substrate can include a plurality of first waveguides. The third substrate can include a plurality of second waveguides.

A spacing between adjacent second waveguides can increase toward the second end of the third substrate.

At least two of the substrates can include mating alignment features.

Also disclosed herein is a method comprising: (a) providing a first waveguide having a tapered end; (b) providing a second waveguide having a tapered end; (c) positioning the tapered ends of the first and second waveguide overlapping in spaced parallel or substantially parallel relation; (d) providing an optical fiber positioned in optical alignment with an end of the second waveguide opposite the tapered end; (e) propagating light toward the tapered end of the first waveguide producing evanescent light that is received by the tapered end of the second waveguide; (f) propagating evanescent light received by the tapered end of the second waveguide through the second waveguide; and (g) transferring light propagating through the second waveguide to the optical fiber.

The tapered ends of the first and second waveguide overlapping in spaced substantially parallel relation can have their longitudinal axes aligned ±2°. In an example, the optical alignment of step (d) can be within known industry tolerances for optical alignment of the axis of the optical fiber with the axis of the end of the second waveguide opposite the tapered end.

The tapered ends of the first and second waveguide can overlap by 300 micrometers±30 micrometers.

The optical fiber can be disposed on a first substrate and can have a first end including interconnect nodules. The first waveguide can be disposed on a second substrate that can have a first end including interconnect nodules. The method can further include positioning the interconnect nodules on the first ends of the first and second substrates in contact with or mating with each other.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A method comprising:
   (a) providing a first waveguide having a tapered end;
   (b) providing a second waveguide having a tapered end;
   (c) positioning the tapered ends of the first and second waveguide overlapping in spaced parallel or substantially parallel relation;
   (d) providing an optical fiber positioned in optical alignment with an end of the second waveguide opposite the tapered end;
   (e) propagating light toward the tapered end of the first waveguide producing evanescent light that is received by the tapered end of the second waveguide;
   (f) propagating evanescent light received by the tapered end of the second waveguide through the second waveguide; and
   (g) transferring the light propagating through the second waveguide to the optical fiber.

2. The method of claim 1, wherein the tapered ends of the first and second waveguide overlapping in spaced substantially parallel relation have their longitudinal axes aligned ±2°.

3. The method of claim 1, wherein the tapered ends of the first and second waveguide overlap by 300 micrometers±30 micrometers.

4. The method of claim 1, wherein:
   the optical fiber is disposed on a first substrate having a first end including interconnect nodules; and
   the first waveguide is disposed on a second substrate having a first end including interconnect nodules, wherein:
   the method further includes positioning the interconnect nodules on the first ends of the first and second substrates in contact with or mating with each other.

* * * * *

UNITED STATES PATENT AND TRADEMARK OFFICE
CERTIFICATE OF CORRECTION

PATENT NO. : 10,598,861 B2
APPLICATION NO. : 16/565740
DATED : March 24, 2020
INVENTOR(S) : Jason M. Kulick et al.

Page 1 of 1

It is certified that error appears in the above-identified patent and that said Letters Patent is hereby corrected as shown below:

On the Title Page

Column 1, Related U.S. Application Data (Item (63)), Line 1, delete "Continuation" and insert -- Division --

Signed and Sealed this
Sixteenth Day of June, 2020

Andrei Iancu
*Director of the United States Patent and Trademark Office*